US009471872B2

(12) United States Patent
Anand et al.

(10) Patent No.: US 9,471,872 B2
(45) Date of Patent: Oct. 18, 2016

(54) EXTENSION TO THE EXPERT CONVERSATION BUILDER

(75) Inventors: Rangachari Anand, Teaneck, NJ (US); Juhnyoung Lee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 13/538,634

(22) Filed: Jun. 29, 2012

(65) Prior Publication Data
US 2014/0006319 A1 Jan. 2, 2014

(51) Int. Cl.
G06N 5/02 (2006.01)

(52) U.S. Cl.
CPC ........................................ G06N 5/02 (2013.01)

(58) Field of Classification Search
None
See application file for complete search history.

(56) References Cited

U.S. PATENT DOCUMENTS

| | | | |
|---|---|---|---|
| 6,711,585 B1* | 3/2004 | Copperman et al. | |
| 7,280,965 B1* | 10/2007 | Begeja | G10L 15/18 704/257 |
| 8,000,973 B2 | 8/2011 | Williams et al. | |
| 8,503,665 B1* | 8/2013 | Meisel | 379/266.07 |
| 2001/0047261 A1* | 11/2001 | Kassan | G10L 15/30 704/270 |
| 2001/0049688 A1* | 12/2001 | Fratkina et al. | 707/104.1 |
| 2003/0028595 A1* | 2/2003 | Vogt et al. | 709/204 |
| 2003/0115254 A1* | 6/2003 | Suzuki | 709/202 |
| 2004/0002049 A1* | 1/2004 | Beavers et al. | 434/350 |
| 2005/0027536 A1* | 2/2005 | Matos et al. | 704/270.1 |
| 2005/0055321 A1* | 3/2005 | Fratkina et al. | 706/45 |
| 2005/0080628 A1* | 4/2005 | Kuperstein | H04M 3/4938 704/270.1 |
| 2005/0259806 A1* | 11/2005 | Chang | H04M 3/4931 379/218.01 |
| 2007/0226628 A1* | 9/2007 | Schlack | 715/733 |
| 2008/0294637 A1* | 11/2008 | Liu | 707/6 |
| 2009/0006371 A1* | 1/2009 | Denoue et al. | 707/5 |
| 2009/0018829 A1* | 1/2009 | Kuperstein | 704/235 |
| 2009/0041215 A1 | 2/2009 | Schmitt et al. | |
| 2009/0119104 A1* | 5/2009 | Weng et al. | 704/244 |
| 2009/0306995 A1* | 12/2009 | Weng et al. | 705/1 |
| 2010/0070345 A1* | 3/2010 | Abelow | 705/10 |
| 2010/0124325 A1* | 5/2010 | Weng et al. | 379/265.11 |
| 2011/0200979 A1* | 8/2011 | Benson | G09B 7/00 434/350 |
| 2011/0212430 A1* | 9/2011 | Smithmier et al. | 434/322 |

(Continued)

FOREIGN PATENT DOCUMENTS

WO 2012048416 A2 4/2012

OTHER PUBLICATIONS

International Search Report mailed Oct. 18, 2013 in corresponding International Application No. PCT/US2013/038721.

(Continued)

Primary Examiner — Stanley K Hill
Assistant Examiner — Ilya Traktovenko
(74) Attorney, Agent, or Firm — Scully, Scott, Murphy & Presser, P.C.; Louis J. Percello, Esq.

(57) ABSTRACT

Building a runtime dialog is provided. An initial answer to an initial question is received from a user. A state of a conversation thread is created based on the initial answer. A next question to ask is automatically selected by a processor based on the updated state of the conversation thread. The next question is presented to the user. A next answer to the next question is received. The state of the conversation thread is updated based on the next answer. The selecting, presenting, receiving, and updating are repeated until a criterion is satisfied.

24 Claims, 7 Drawing Sheets

(56) References Cited

U.S. PATENT DOCUMENTS

2012/0076283 A1 3/2012 Ajmera et al.
2012/0173243 A1 7/2012 Anand

OTHER PUBLICATIONS

Jannach et al., Developing a conversational travel advisor with Advisor Suite, In Frew, A.J. (Ed.) Information and Communication Technologies in Tourism, Proceedings ENTER 2007, Springer, 2007, pp. 43-52.

Neill et al, Implementing advanced spoken dialogue management in Java, Science of Computer Programming 54 (2005) 99-124.
Levin et al., A Stochastic Model of Computer-Human Interaction for Learning Dialogue Strategies, Eurospeech 97, 1997, pp. 1883-1886.
Foster et al., Multimodal Generation in the COMIC Dialogue System, Proceedings of the ACL Interactive Poster and Demonstration Sessions, pp. 45-48, Ann Arbor, Jun. 2005, Association for Computational Linguistics.
Woods, Transition Network Grammars for Natural Language Analysis, Computational Linguistics, Communications of the ACM, vol. 13, No. 10, Oct. 1970.

* cited by examiner

EXTENSION TO THE EXPERT CONVERSATION BUILDER

FIELD

The present application relates generally to computers, and computer applications, and more particularly to building an expert conversation using runtime dialog building tool.

BACKGROUND

Call center or support workers often need to walk customers through complex multi-step procedures, for example, in diagnosing or solving problems such as fixing PC networking problems, diagnosing and fixing problems in machinery, solving mobile phone problems for customers, and others. Challenges in following through such procedures may include cognitive overload in keeping track of the current state of the conversation, e.g., where exactly am I in the procedure? How did I get here? A further complication is that multiple lines of inquiry may be active simultaneously. Conversation can span multiple calls, and resuming a conversation can be tedious.

BRIEF SUMMARY

A system of building a runtime dialog, in one aspect, may comprise a dialog portal operable to provide an interface to pose a plurality of questions to a user and receive a corresponding plurality of answers from the user. A thread maintenance module may be operable to maintain a conversation state based on the received answers. A question selection module may be operable to select a next question to pose based on the conversation state, a question selection policy and a dialog repository.

A method of building a runtime dialog, one aspect, may comprise receiving an initial answer to an initial question from a user. The method may also comprise creating a state of a conversation thread based on the initial answer. The method may further comprise selecting a next question to ask based on the state of the conversation thread from a dialog repository and a question selection policy. The method may also comprise presenting the next question to the user. The method may further comprise receiving a next answer to the next question. The method may further comprise updating the state of the conversation thread based on the next answer. The method may also comprise repeating the selecting, presenting, receiving, and updating until a criterion is satisfied.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
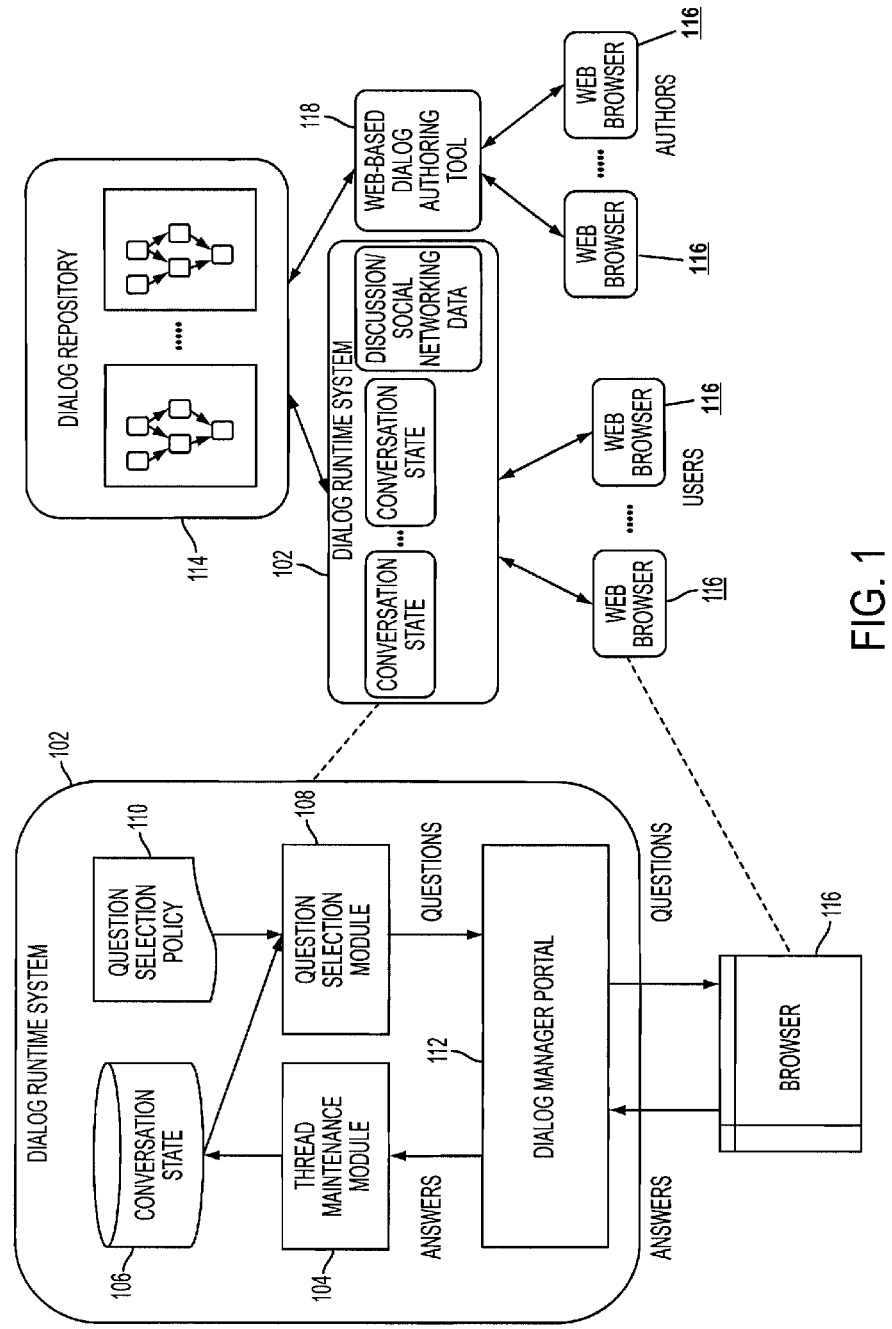
FIG. 1 illustrates question selection system architecture in one embodiment of the present disclosure.

A Dialog Manager is a web-based tool that is used to author and conduct structured dialogs. Typical use is to help call center workers perform complex procedures such as diagnosing and fixing complex hardware and software. Self-service applications are also possible, and the utility is not limited to diagnostic procedures. Built-in authoring tools are designed to be used directly by subject matter experts to author dialog content. No special desktop software required. The Dialog Manager is well suited to conversational applications in which the system takes the initiative, e.g., as in inverse of the Watson™ (Deep Q&A) use case.

Co-owned U.S. patent application Ser. No. 12/985,050 filed on Jan. 5, 2011 discloses an expert conversation builder. That application is incorporated herein by reference in its entirety. The expert conversation builder may comprise a knowledge database comprising a dialog repository comprising a plurality of dialogs, each dialog representing a framework for creating at least one expert conversation and comprising a plurality of nodes and a plurality of edges extending between pairs of nodes. A runtime dialog system may execute on a computing system and in communication with the knowledge database, the runtime dialog system may be configured to conduct the expert conversation between the runtime dialog system and a user based on a given dialog selected from the plurality of dialogs by presenting comments and questions derived from nodes in the given dialog to the user, inputting data from the user in response to the presented comments and questions and identifying appropriate edges at each node based on the inputted data. A web-based browser may be in communication with the runtime dialog system and configured to display the comments and questions derived from nodes in the given dialog to the user. The expert conversation may comprise a directed acyclic graph constructed from the nodes and edges of the selected dialog.

In the present disclosure, the term "dialog" generally refers to a data structure comprising a network of nodes. The term "conversation" is an operational term that generally refers to a specific exchange of data between a human (or another that for example answers questions) and a dialog manager tool or system.

In the present disclosure, a question selection policy may be presented in which depth-first, breadth-first, or goal-oriented question selection may be applied, and machine learning may be employed to shorten the length of a dialog to the resolutions of an issue involved with a dialog. In another aspect, a detached model (loosely-coupled operation model) is presented in which a user sets up the expert conversation builder (e.g., both knowledge base (KB) and runtime) offline in his/her computer. The user may further incrementally download changes to the KB and runtime as necessary or desired. Periodically when network connectivity is available, the offline expert conversation builder uploads the usage data from the user's computer to the server so that it will be reflected in the usage data analysis. Yet in another aspect, a social networking augmentation mechanism may be provided which includes a real-time discovery of similar conversations (e.g., ongoing and historically) and their associated information (e.g., topic, parties involved in the conversation). Such social networking augmentation mechanism may allow the user to use the information to access the parties involved for additional information to improve the dialog.

Question Selection Policy

A dialog may be represented or structured as a directed acyclic graph. Nodes roughly represent turns in a conversation. Edges represent actions related to answers submitted by users. There may be several types of nodes: Multiple choice single answer, Multiple choice multiple answer, and Text classification nodes. Nodes can include an attached script (executable program code or computer instructions) that allows invocations to external databases and web services or the like. Such dialog representation may have similarities with decision trees since both kinds of systems ask questions and use answers to draw conclusions. The difference may lie in the issue of ordering and sequence. Dialogs have a strong element of ordering. Decision trees typically represent a set of questions that could be asked in any order. Algorithms such as C4.5 can reorder questions so as to minimize the number of questions to be answered by the user, e.g., using information entropy. Even though dialogs may be represented by a simple graph, conversation state is complex. For example, multiple nodes may be simultaneously active. Users should be allowed to change answers to questions with consistent results. There may be a need to provide users with explanations, for instance, how did I get to this point in the conversation? Also, conversation state may need to be saved and resumed by a different user, e.g., to be useful in call centers.

Figure 2:
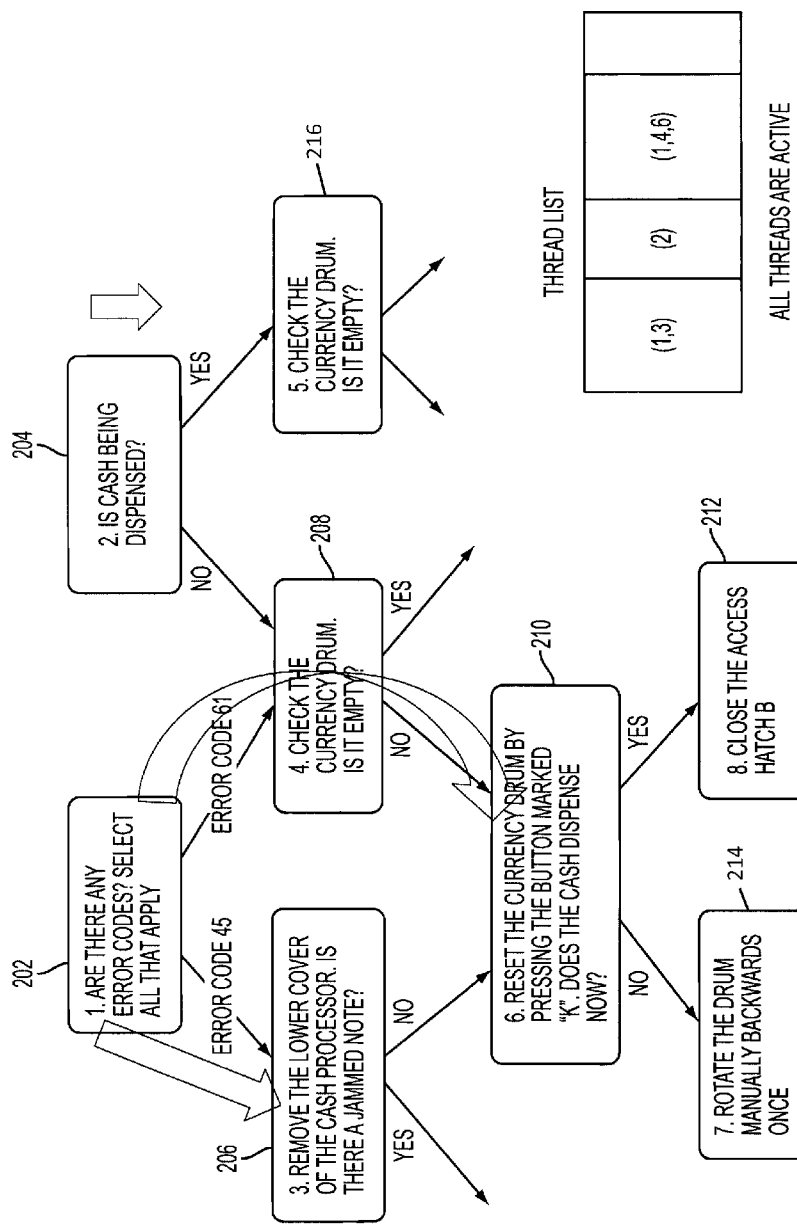
FIG. 2 illustrates a sample dialog structure with conversation thread in one embodiment of the present disclosure.

FIG. 2 illustrates a sample dialog structure overlaid with conversation threads in one embodiment of the present disclosure. Example nodes (e.g., 202, 204, 206, 208, 210, 212, 214 and 216) are shown. A thread is a pathway through the dialog graph, e.g., created as nodes become activated. A conversation state is a set of threads, e.g., an ordered list of threads. A conversation thread of the present disclosure in one embodiment may provide succinct explanation of node activity, and provide consistent ways to handle changes to answers. This example shows two designated start nodes 202, 204, which represent starts of conversations. There may be multiple active conversation threads, e.g., a conversation thread comprising 202, 206, another conversation thread comprising 202, 208, 210, yet another conversation thread comprising 204. The last node of an active thread has an unanswered question. The node at 212 may be considered a terminal node. Multiple threads may be active during a conversation or at a particular point in the conversation. In one embodiment of the present disclosure, the thread mechanism defines the necessary conditions for a question to be asked. A question selection policy is a mechanism for determining the questioning conditions, for example, how many questions will be displayed to the user, which questions will be displayed to the user, how to handle user's refusal to answer any of the displayed questions. A question selection policy may be orthogonal to the thread maintenance algorithm. Many possible policies can be used. For example, depth first policy shows one question at a time and stays with a thread until the thread can no longer be extended, and then switches to another thread. Breadth first or like policy, may display multiple questions, showing all possible questions. Dynamic question policy may select questions based on the current state of the conversation.

FIG. 1 illustrates question selection system architecture in one embodiment of the present disclosure. A dialog runtime system 102 may execute on a processor or the like and may be configured to conduct a conversation between the runtime dialog system 102 and a user 116, inputting data from the user in response to questions and identifying appropriate edges at each node based on the inputted data. A web-based browser 116 may be in communication with the runtime dialog system and configured to display the comments and questions derived from nodes in the given dialog to the user. The expert conversation may comprise a directed acyclic graph constructed from the nodes and edges of the selected dialog, for example, as shown at 114. The Dialog Repository 114 stores one or more dialogs (e.g., in directed acyclic graph data structure format) in one or more databases. This is a static image of dialogs. When a user starts a conversation with the Dialog Manager, the runtime 102 kicks in. A conversation has one or more dialog threads going through one or more dialogs stored in the repository 114. A conversation is dynamically evolving through interaction between the user and the system, and the runtime system 102 manages it by storing the conversation state. The runtime system 102 also manages other modules it has in 102.

A dialog runtime system 102 or dialog manager of the present disclosure may include a thread maintenance module 104 that processes answers submitted by a user to update, create and manage the state of conversation threads, for example, in a conversation state database or the like 106. The conversation state database 106 may store conversation states such as shown in FIG. 2. A question selection module 108 may determine the questions to ask at a particular point in a conversation based on the conversation state (i.e., the list of threads) 106 and a question selection policy 110. The question selection policy 110 may be specified by the author of a dialog, which may be interpreted by the question selection module 108. The author of a dialog may be one or more subject matter experts, who create dialogs during build-time, for example, before the Dialog Manager is used for user conversation. The authors may use a Web-based authoring tool 118 to author content/dialogs in the Dialog Repository 114. The author may include one or more suggestions and tips on question selection as part of the dialog. For example, the author may suggest that the depth first approach may resolve the problem faster, but may be more difficult to understand. The information may be stored in a machine understandable format such as in a markup language, e.g., extensible markup language (XML). The question selection module 108 may utilize the suggestion or choose to not use it.

In one embodiment of the present disclosure, the question selection policy may comprise question ordering algorithms and question number algorithms. Question ordering algorithms may comprise depth first, breadth wise, usage based weighting, supervised machine learning, and custom scripting. Question number algorithms may comprise fixed number, supervised machine learning, and custom scripting. Question number refers to the number of questions that will be asked of the user at each step of a dialog. Because the Dialog Manager allows multiple choice questions, and allows multiple dialog threads alive, there may be multiple questions eligible to be asked at each point in a dialog. The question number algorithm may decide how many questions to display to the user, e.g., a fixed number or determined with an algorithm, e.g., dynamically.

A depth first question ordering algorithm may stay on a thread until the user either does not provide an answer or reaches a terminal node. This algorithm may pick the next thread in reverse order of creation. This action may occur when the user does not provide an answer or reaches a terminal node in the current node. The algorithm checks if there is any additional live thread. If so, it may select the one in reverse order of creation. The depth-first question ordering algorithm implies a single question selection display. The breadth-wise question ordering algorithm may display all questions eligible to be asked and may imply multiple question selection. The usage based weighting question ordering algorithm may order questions based on frequency with which that question was answered in previous conversations. The supervised machine learning question ordering algorithm may train a machine learning (ML) classifier to order the questions given a particular set of active nodes. The script based question ordering algorithm may be used to precisely specify the question ordering and may enable switching the algorithms based on conversation state. For example, question selection may start with breadth-wise selection of questions and then switch to depth first as a user shows signs of interest in a particular thread. A Dialog Manager portal 112 is an interface via which a user may access the dialog runtime system of the present disclosure. The portal 112 manages the display of questions to be asked at each point in a dialog as determined by the runtime system 102. The portal, e.g., is accessible by a web browser of the user. The portal 112 receives the answers to the displayed questions and transmits it to the runtime system module's thread maintenance module 104.

Figure 3:
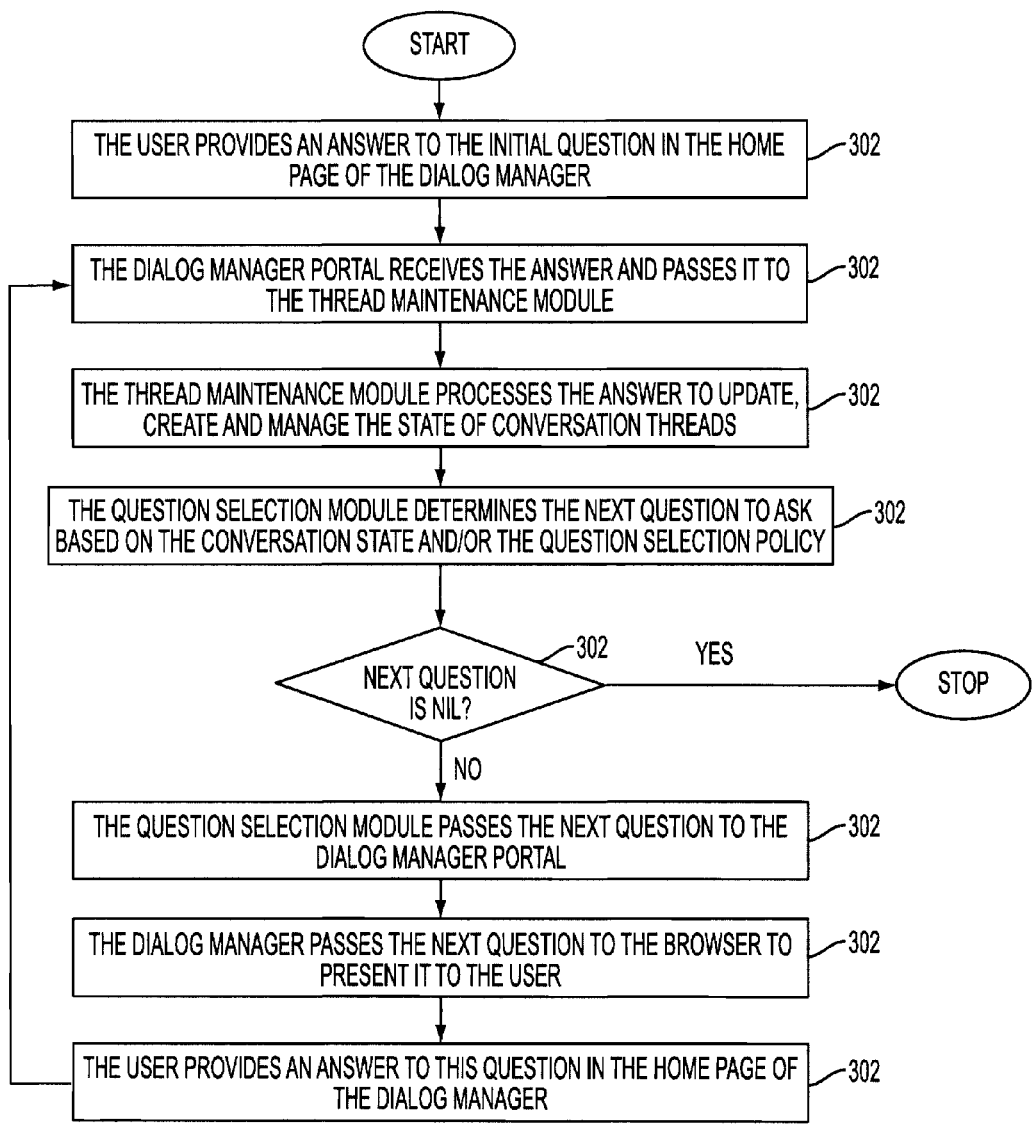
FIG. 3 is a flow diagram illustrating a method of question selection in one embodiment of the present disclosure.

FIG. 3 is a flow diagram illustrating a method of question selection in one embodiment of the present disclosure. At 302, an answer to an initial question may be received from a user. The initial question, for example, may be posed or presented to the user on the home page of a Dialog Manager. At 304, a Dialog Manager's portal may receive the answer and communicate the answer to a thread maintenance module. At 306, the tread maintenance module may process the answer to update, create and manage the state of conversation thread. For example, depending on the received answer, an active thread's status may need to be updated. Also, one or more new threads may need to be created. All the changes to the threads and their state should be recorded in the conversation state database 106 for later reference. At 308, a question selection module may determine the next question to ask based on the conversation state and/or the question selection policy. The questions are represented as the nodes in dialogs represented as directed acyclic network/graph. The state of a conversation is a collection of threads currently active in a conversation and the state of each of the threads, as shown in arrows and "thread list" in FIG. 2.

At 310, it is determined whether the next question is NIL. For instance, when a terminal node of all active threads is reach, no more questions to ask are left. If the next question is determined to be NIL, the logic of the method stops.

At 312, if there are more questions, the question selection module communicates the next question to the Dialog Manager's portal (or the like). At 314, the Dialog Manager's portal communicates the next question to a user browser or the like to present that question to the user. At 316, the user provides the answer, and the method returns to 304 to repeat the process, e.g., until there are no more questions.

Detached Operations

Figure 4:
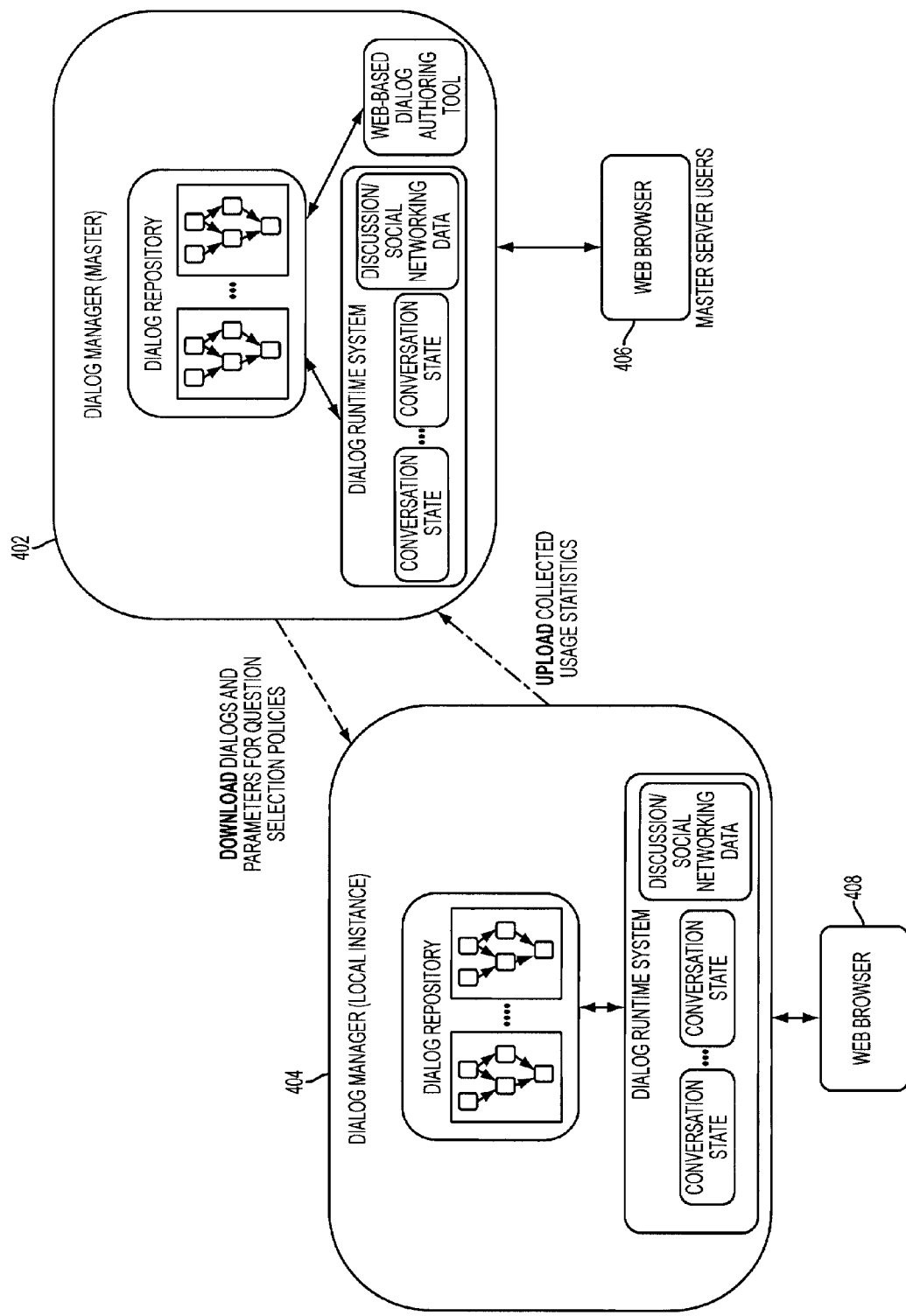
FIG. 4 illustrates detached operation system architecture in one embodiment of the present disclosure.

FIG. 4 illustrates detached operation system architecture in one embodiment of the present disclosure. A Dialog Manager is a centralized system that benefits from being shared by multiple users and enables centralized authoring, usage statistics and social networking features. A mobile user even with limited network connectivity may be allowed to use the Dialog Manager. The benefits of a centralized Dialog Manager system may be retained while enabling a level of functionality for detached users. A detached Dialog Manager 104 is a detached local instance version of a master Dialog Manager 402. Master server users, for example, via their web browsers 406 or the like may utilize the master Dialog Manager 402 functionalities. Local instance users, for example, via their web browsers 408 or the like, for example, those with intermittent connectivity, may utilize a local instance of the Dialog Manger 404.

In one embodiment of the present disclosure, all authoring may be performed on the master 402. Users may run dialogs both from the master server 402 and from the detached server 404. When the detached Dialog Manager 404 is connected to a network with a direct network connection to the master Dialog Manager 402, the collected usage statistics may be uploaded from the local instance of the Dialog Manager 404 to the master Dialog Manager 402. Further, dialogs and parameters for dialog question selection policies may be downloaded. The downloaded data includes newly created dialogs in the Dialog Repository if any, for example, those that are created while the user is using the detached version.

Dialogs may be created by subject matter experts during the build time. However, in one embodiment of the present disclosure, where a Dialog Manager is used in an enterprise environment, there may be multiple authors and multiple users at the same time or simultaneously. Thus, the build time and the runtime may be the same or overlap in time. Thus, dialogs may be continuously created and revised while they are being used by multiple users. What is created during the question (and answering) is a conversation comprising one or more active threads.

Figure 5:
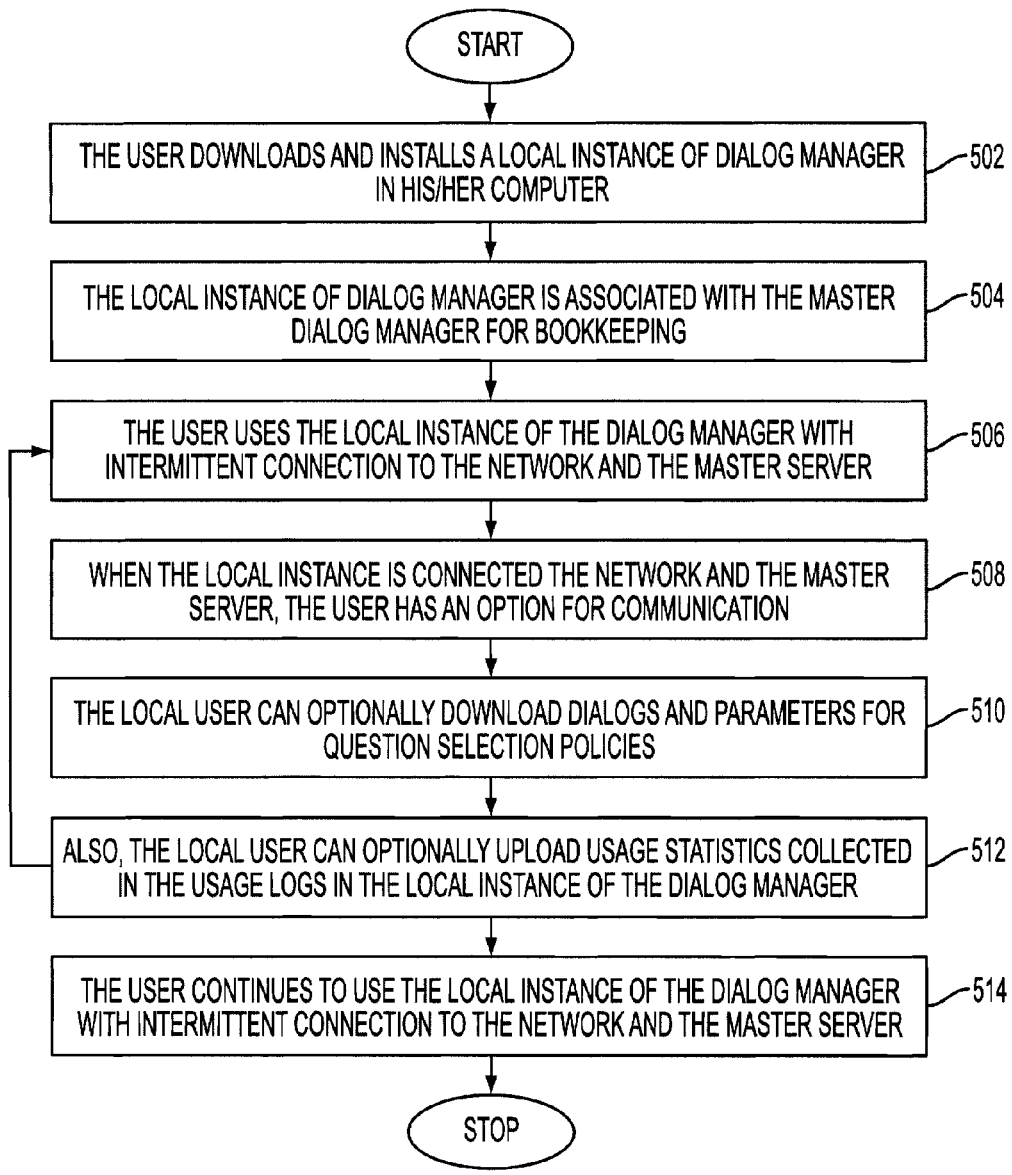
FIG. 5 shows a flow diagram of a method of detached operation in one embodiment of the present disclosure.

FIG. 5 shows a flow diagram of a method of detached operation in one embodiment of the present disclosure. At 502, a user may download and install a local instance of Dialog Manager in the user's computer. At 504, the local instance of Dialog Manager is associated with the master Dialog Manager for bookkeeping. The version of the Dialog Manger may be recorded for later synchronization. The version indicates all the dialogs, all their parameters and configuration. For the process, a version control system may be employed to facilitate the synchronization and data management once detached system is connected to the network and the master system again. At 506, the user may use the local instance of the Dialog Manager, e.g., with intermittent connection to the network and the master server. At 508, after the local instance's network connection to the master server is established, the user has an option to communication. At 510, the local user may optionally download dialogs and parameters for question selection policies.

At 512, the local user may optionally upload usage statistics collected in the usage logs in the local instance of the Dialog Manager. The usage statistics may comprise a series of user activities in the Dialog Manager system, e.g., who accessed which node in which dialog in the repository and provided what answer to it, with its timestamp, for example, for analysis and report, for later recalibration of the dialogs and the system.

The uses may continue as in 506, 508, 510, 512, whenever there is a network connection between the local user's computer and the master server. Thus, at 514, the user may continue to use the local instance of the Dialog Manager even with intermittent connection to the network and the master server.

Social Networking

The social networking feature in one embodiment of the present disclosure may build an effective community of users around the Dialog Manager. The social networking feature of the present disclosure in one embodiment may facilitate user to user interactions, user to author interactions, and author to author interactions.

Figure 6:
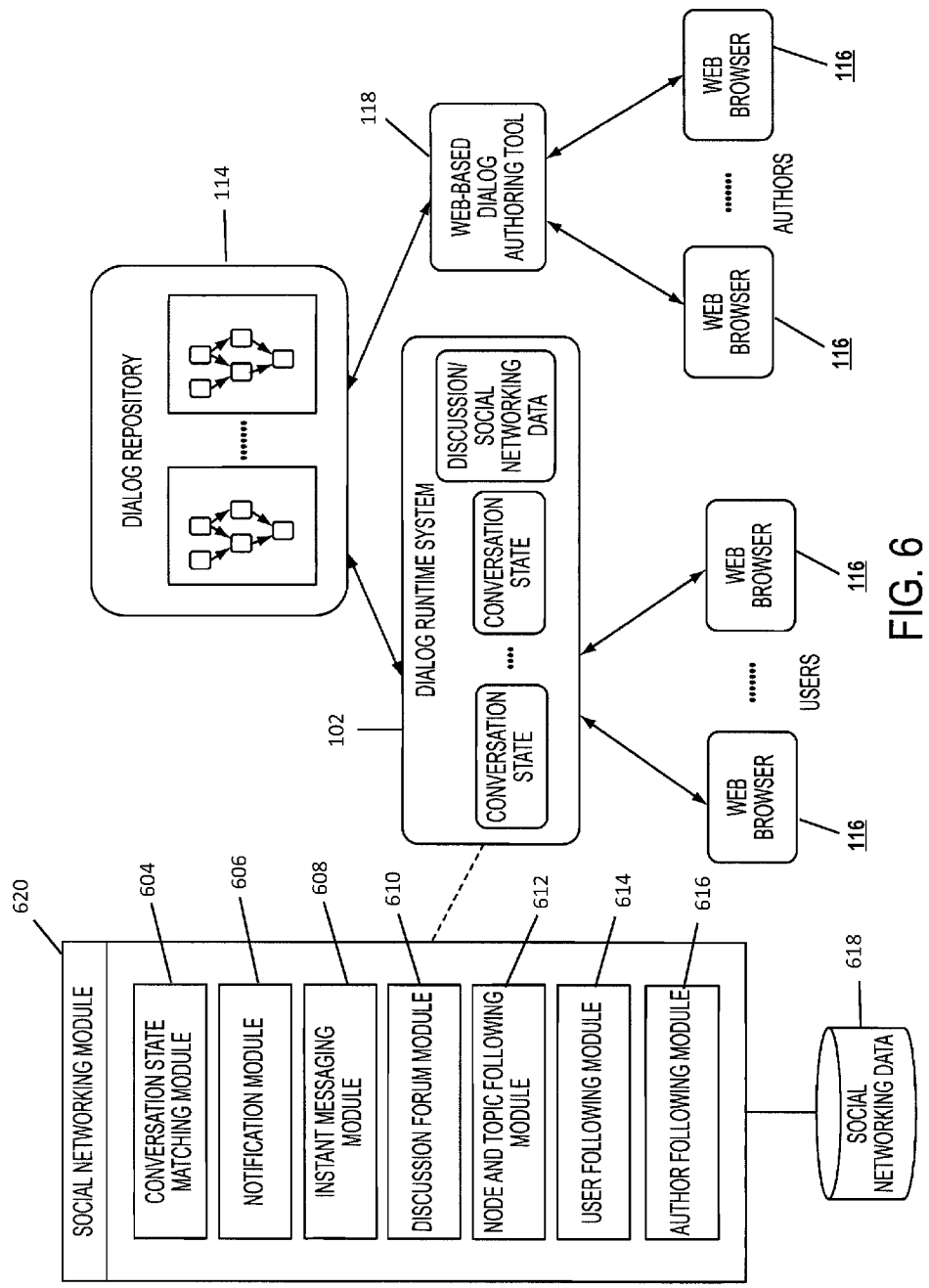
FIG. 6 illustrates social networking system architecture in one embodiment of the present disclosure.

FIG. 6 illustrates social networking system architecture in one embodiment of the present disclosure. Social networking mechanisms in one embodiment of the present disclosure may include a node- and topic-based discussion forums, which allows users to provide authors with feedback and exchange ideas with each other. Another social networking mechanism may include conversation state matching, which may be based on the current state of a conversation, and which may retrieve other archived conversations that have a similar state. The conversation state matching may help a user locate other users who have encountered a similar situation and may provide a natural segue into a chat, i.e., instant messaging, feature. Activity following (e.g., as in Twitter™) type of social networking mechanism may include following a topic or a node, e.g., get a notification whenever a conversation encounters specified node or topic; following a particular user, e.g., get a notification whenever specified user starts a conversation; and following an author, e.g., get a notification whenever a specified author makes a change to a dialog.

The social networking module of the present disclosure may utilize a built-in discussion system based around nodes. When a user is viewing a node within a conversation, he or she can make comments or suggest improvements. The module may keep track of usage of dialogs in the Dialog Repository and can suggest other users who have a similar usage pattern, similar to "friend suggestion" feature in social networks. In the case of Dialog Manager, it may make a recommendation such as, a user who uses this dialog in the repository also tends to use that dialog, and it may address resolution of a problem at hand or one or more related ones. The recommendation may be made based on social behavior of one or more friends of a social networking site, shoppers of online shopping site, and/or dialog users of the Dialog Manager.

The social networking module may be integrated with an instant messaging utility, e.g., to open a chat window with other such users.

Referring to FIG. 6, a social networking module of a dialog runtime system 620 may comprises a conversation state matching module 604, a notification module 606, an instant messaging module 608, a discussion forum module 610, a node and topic following module 612, a user following module 614 and an author following module 616. The social networking module communicates with a social networking data 618.

The conversation state matching module 604 may retrieve other archived conversations (e.g., previous conversation threads from the dialog repository) that have a similar state as the current conversation state. Features of conversation such as types and number of questions and their answers may be captured computationally. They can be compared and clustered by using machine learning, clustering algorithms that are supervised or unsupervised or combinations of both. By setting a threshold level, the module may identify zero or more conversations in the database which match the profile of the current conversation.

The notification module 606 may notify the identified conversations which match the profile in a form of recommendation, e.g., "The users who had similar conversations also had that conversations." The notification may be emailed or displayed in the portal as a recommendation.

The instant messaging module 608 may enable the users of the Dialog Manager to utilize one or more instant messaging systems while in conversation by using the Dialog Manager. For example, the user may want to reach another user, e.g., who might be more knowledgeable about the subject matter and Dialog Manager, who may have used similar dialogs in the Dialog Manager, via an instant messaging facility to ask how to best answer the question asked by the Dialog Manager. That is, a human conversation through an instant messaging may be performed while engaged in a conversation with a machine (Dialog Manager).

The discussion forum module 610, similarly may enable the users of the Dialog Manager to access one or more discussion forums on the web directly from the Dialog Manager, e.g., to find information that may not be available in the dialogs in the Dialog Manager. This can be a search engine to the Web. The search results may be connected to one or more dialogs in the repository, so that the user can maximize the use of Dialog Manager by combining forums and search engines.

The node and topic following module 612 may function similarly to the "Follow" button in social networking sites. This module may enable the user of the Dialog Manager to get notified (e.g., via email, web browser, mobile devices, etc.) whenever there is an addition and/or revision to one or more topics and the nodes under that topic in the dialog repository. The nodes in directed acyclic networks contain questions. The questions in the dialogs in the repository may be categorized or tagged by topic or subject in one embodiment. Tagging can be done manually by human authors and/or editors of the dialogs. It can also be done by an algorithm by using techniques such as machine learning, text mining, and/or other techniques.

The user following module 614 may enable the user of the Dialog Manager to follow one or more users in the system. The latter may be ones who are working in the same department, supporting similar kind of systems and software, etc., so that the former may think following and learning what the latter is up to may be useful.

The author following module 616 enable the user of the Dialog Manager to follow one or more authors of dialogs in the system. An author may be one who wrote dialogs that have been useful in problem resolution by the following user. For example, the user may want to know what the author has been up to recently, what new dialogs the author writes, and if the new dialogs might be useful for resolving future problems given to the following user.

The social networking database 618 may log all the usage of the above social network modules—the use of instant messages (e.g., by whom, to whom, what and when), the use of forums and search engines (e.g., what search key words, when by whom), the use of topic following (e.g., by whom, what topic, when), the use of user following (e.g., which user by whom, what, when), and the author following (e.g., which author by whom, what, when). All this data may be used for analysis and report—to recalibrate the social network feature modules and their operations, and the content they use, e.g., to configure the performance and operation of Dialog Manager and also, e.g., to provide targeted marketing and advertisement.

Referring back to FIG. 1 at 120 (and also shown in FIGS. 4 and 6), a web-based authoring tool may provides an interface and functionalities for enabling a user to author the dialogs, for example, via a web browser or the like 116. Such authored dialog may be stored in a dialog repository 114 such as a computer readable storage medium. In one embodiment of the present disclosure, the authoring tool may include authoring functionalities such as document-based authoring, touch screen interface for authoring, real-time collaborative authoring, and indexing of content and crowd-sourcing for content authoring.

Document-based authoring may include authoring a plurality of dialogs by automatically or semi-automatically extracting nodes and links from electronic documents such as ones from word processors, spreadsheet, graphical drawing documents, and other electronic documents in various document formats. Document-based authoring may also conversely include generating text documents (e.g., for frequently asked questions in Microsoft® Word® or hypertext mark-up language (HTML) embedding internal links) out of dialogs (represented nodes of a dialog tree) 114 authored with the Dialog Manger authoring tool 120.

Touch screen interface for authoring may include displaying a plurality of dialogs in a directed acyclic graph in a touch screen interface allowing one or more authors to explore and navigate the repository (e.g., FIG. 1 114) by using visual and touch operations such as zooming, panning, fisheye, etc., and similarly edit one or more dialogs merging nodes, panning nodes, adding/removing edges between nodes, etc. by using the touch operations.

Real-time collaborative authoring may include an authoring system that allows two or more authors 118 to work (e.g., create, modify) on a dialog in the dialog repository 114 in real time with the changes merged, synchronized and displayed in real time.

Indexing of content and crowd-sourcing for content authoring may include categorizing and indexing nodes in a dialog repository 114 by topic and providing shortcuts in choosing subareas of authoring and questioning.

The web browser may be an authoring interface for the Dialog Manager. However, much dialog-like material is often stored in various ad-hoc formats within an enterprise, e.g., as Word™ documents, PDF files and text files, Visio™ diagrams, Excel™ spreadsheets, Forums, FAQs, wikis, etc. In order to facilitate adoption of the Dialog Manager, a dialog import feature may be provided to create the skeleton of a dialog based on such materials. Each of the above kinds of documents requires a specialized approach to facilitate knowledge extraction. The advantage of the approach of the present disclosure is that node content can easily be created from the source document. For example, a user 118 may be presented with a screen or a view of a text document, one or more portions of which the user may mark up. The marked portion is created as a node of a dialog tree. Similarly, a user 118 may be presented with a diagrammatic document including graphical components or elements (e.g., a Visio™ or PowerPoint™ chart elements), and enabled to select one or more components to be created as a node in a dialog tree. Yet in another embodiment, a user may be presented with a view of a dialog tree, and enabled to select one or more nodes from the tree, whose content may be generated as a text document.

To extract dialogs from a document, an author may import the document and display it on the screen. The author may optionally upload a dialog (from a dialog repository) for augmentation or start creating a new one. The author may select, e.g., draw boxes around a piece of text or diagram region that represents content of a node in a dialog. The text content of the boxes becomes the initial textual content of a node. The author optionally may edit the content of the node, e.g., edit the text, update images, or others. The Dialog Manager can maintain backward links from the dialog to the source document for later use, for example, for a revision, audit, and other purposes. The Dialog Manager can infer links between the nodes, e.g., by detecting linear occurrence of the blocks within the text, and lines in a diagram. The author can add, delete, and/or modify the links manually. The author may repeat the selecting content of a document and creating a node of the dialog. The author may save the created dialog in the dialog repository, e.g., for use and editing later.

Authoring may also be smart device-based. With the availability of powerful new touch screen-based tablets and other smart devices, dialog authoring can be performed by using a multi-touch interface to create, link and layout nodes, using touch gestures and device sensors like the gyroscope and accelerometer to rapidly navigate to various parts of a dialog, and using a built-in camera to take photos or videos that can be used as the content of dialog nodes. For smaller form-factor devices offering a touch interface such as smart phones, the device's camera can be used to add visual content to dialog nodes.

Touch screen-based authoring may include using a gesture to create a node, e.g., tapping on an unoccupied part of the screen and linking two nodes together, e.g., by selecting multiple nodes and explicitly specifying a link. A node may be dragged to the immediate vicinity of another node to which a link is desired. A dialog may be visually laid out. Individual nodes can be moved by dragging it with a finger. Moving a node may have an impact on other nodes as well. In coil-spring metaphor, links are treated as coil springs and nodes have mass and offer frictional resistance to moving. The idea is to localize the impact of a move. In rigid link metaphor, when a node is moved, adjacent nodes will also be dragged. Individual nodes may be pinned down, e.g., by gesture such as double tapping on the node. These nodes will not move when adjacent nodes move. In addition, pinch-expand gesture and a panning may be used to deal with large dialogs. Nodes may be merged together by dragging a node on top of another. Duplicate nodes may be created by tearing a node apart.

Device sensors may be used for authoring. Some tablets may offer gyroscope and accelerometers to detect motion of the device in three dimensions. For dialog authoring, a user may tilt a tablet for panning through. Virtual reality 3-dimensional (3D) rendering of a dialog may be performed for rapid navigation. By moving the tablet around, a user may view different portions of the dialog as in a panorama photo (see, e.g., http colon-slash-slash (://) occipital dot com slash (/).

A dialog node may be also authored to contain visual content. It is useful to embed photos and videos within node content. Visual content may be especially relevant in dialogs pertaining to complex machinery such as ATM (Automated Teller Machine) and CRU (Cash Recycling Unit). In the case of tablets with integrated cameras, the authoring tool can directly import the photo or video into the content of a node using the tablet based dialog editor. For mobile smart phones that have screens too small for dialog editing, an app running on the phone may communicate over a wireless network to upload visual content to a dialog server. A user may select which node to apply the content. Visual content can be embedded within the main body of the text in a node. Visual content can represent choices within the answers. Both photographs and videos may be used.

In smart device-based authoring, a user may use touch screen interface capabilities of an app, motion sensor interface capabilities of an app, camera and video interface capabilities of an app, and audio interface capabilities of an app, to create, modify and annotate contents of a dialog (contents of a node that represents a dialog).

Authoring may also be collaborative in real-time. Dialog authoring may be an intensely collaborative activity. There may be non-real time mode of collaboration, in which a dialog may be divided into topics and each topic given to an author to work on. This may require allowing authors to reserve topics for exclusive access by using locking. In real-time mode of collaboration, two authors may simultaneously work on a dialog with both seeing exactly the same material. In real-time collaborative authoring, all editing of the document may be instantly visible on the screens of all participating users. Real-time collaborative authoring may also enable new and productive ways to collaborate on text, video, audio content to provide value-adding features, color-coded edits, history playback and undo functions.

Real-time collaborative authoring may include a client-server model. For example, one of the editor instances is assigned the role of collaboration server when the document is opened. This server ensures that other editors are kept in sync by determining network latency and acting as a time synchronization server. The server receives time stamped notifications of local changes made to the document by any author running as client. The server determines how those changes should affect its local copy, and broadcasts its changes to the collaboration pool. The local copies reflect the changes when an official response is returned from the server. A local real-time collaborative authoring tool may display the change in the local copy, e.g., with color coding. The author may save the final version of the dialog in a dialog repository.

Authoring may also be topic-based. "Topic" or "subject" may be utilized for categorizing and organizing nodes in dialogs. For example, every node has an associated topic. Topic serves to identify regions of a dialog. Topics have a containment hierarchy. Subjects can contain other subjects and so provide a structure in nodes. Topic-based authoring may provide a natural way to apportion a large dialog among multiple authors at authoring time. At run time, given a topic, a user can jump straight to the best start node.

Topics may enable non-real time collaboration support. For example, an author may start work on a new dialog. As the dialog grows and subtopics are identified, the original author may invite other authors to join the dialog creation effort ("crowd-sourcing"). The authoring system may support the ability to send invitations to new authors. Invitation may specify a topic and root node for the extension. A new author may create subtopics. Invitations may also be broadcast to a community rather than specifically to single authors. Crowd-sourcing support may allow anyone interested to accept an authoring task. In order to create a sense of competition, the authoring system may maintain a social incentive mechanism such as a scoreboard keeping track of and ranking dialog contributions by authors.

Topic-based authoring may include an author creating a topic hierarchy which contains multiple topics of the subject matter in a structured format. One or more topics in the hierarchy are assigned to one or more authors for creating dialogs under the topics. For each node the author creates (e.g., with a dialog authoring tool), a topic is recommended and assigned. The author saves the final version of the dialog in the dialog repository (e.g., for use and editing later). A topic authoring tool generates indices of nodes by mapping dialog nodes to the topics in the hierarchy. The topic authoring tool saves the topic index in a hierarchy in the dialog repository for the use at running time.

At runtime, the user of the Dialog Manager is given a problem to solve. The user can view the topic index hierarchy to start one or more dialogs to solve the given problem, among other options. The user follows one or more selected dialogs until the solution of the problem is found.

Figure 7:
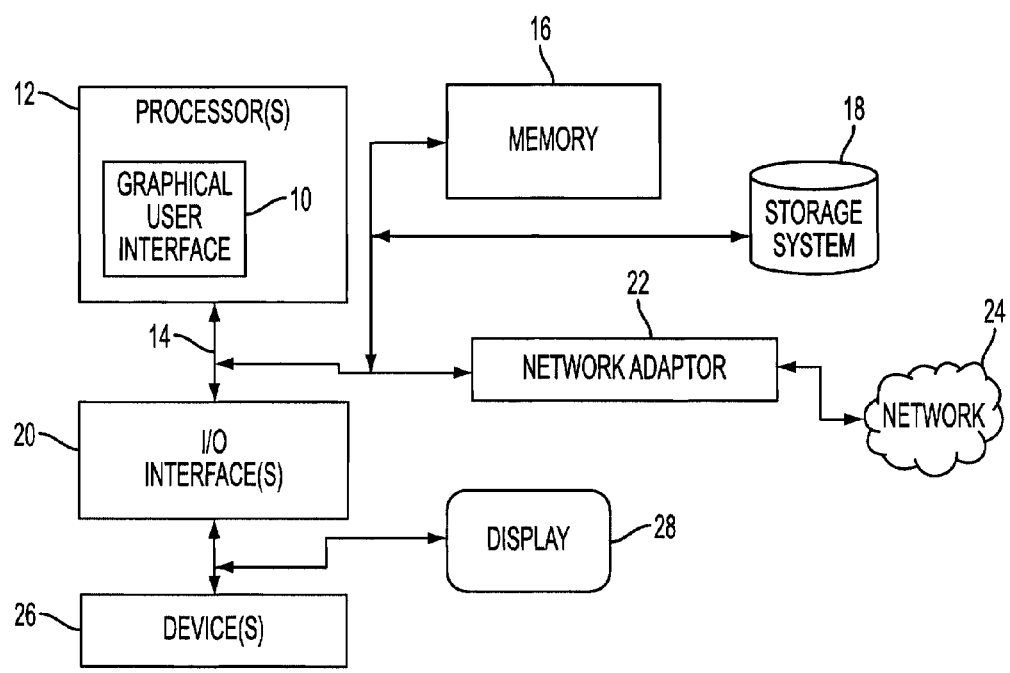
FIG. 7 illustrates a schematic of an example computer or processing system that may implement the expert conversation builder system in one embodiment of the present disclosure.

FIG. 7 illustrates a schematic of an example computer or processing system that may implement the expert conversation builder system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a dialog runtime system or module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of building a runtime dialog, comprising:
receiving an initial answer to an initial question from a user;
creating a state of a conversation thread based on the initial answer;
selecting, automatically by a processor, a next question to ask based on the state of the conversation thread from a dialog repository and a question selection policy;
presenting the next question to the user;
receiving a next answer to the next question;
updating the state of the conversation thread based on the next answer;
repeating the selecting, presenting, receiving, and updating until a criterion is satisfied; and
wherein the question selection policy automatically resolves which question to ask next, responsive to finding that multiple questions are eligible to be asked at a point in a dialog, the question selection policy is specified by a dialog author and comprises one or more of a question ordering algorithm and question number algorithm which automatically resolves which question to ask next, a node of the dialog comprising an attached executable computer instruction that invokes a web service,
wherein the state of the conversation thread comprises a pathway through a dialog graph of a dialog knowledgebase, created as a node of the dialog graph becomes activated and represents a live dialog performed with a user, wherein multiple pathways are created representing multiple live dialog threads in a dialog with the user,
wherein the question selection policy in resolving which question to ask next from the multiple pathways kept with the user, switches between different question ordering algorithms on the multiple live dialog threads.

2. The method of claim 1, wherein the question ordering algorithm comprises depth first, breadth wise, usage based weighting, supervised machine learning, or custom scripting, or combinations thereof.

3. The method of claim 1, wherein the question number algorithm comprises fixed number, supervised machine learning, or custom scripting, or combinations thereof.

4. The method of claim 1, further comprising:
authoring a dialog and storing the dialog in the dialog repository, wherein the authoring comprises one or more of:
document-based authoring that extracts one or more nodes and links from an electronic document to create the dialog;
real-time collaborative authoring that allows two or more authors to work on the dialog in the dialog repository in real-time by merging and synchronizing the two or more authors' work;
smart device-based authoring that allows to use a gesture to create a node of the dialog;
topic-based authoring that allows an author to create a topic hierarchy containing multiple topics of a subject matter in a structured format and assign to one or more other authors for creating additional dialogs under the topics; or
crowd-source authoring that allows the author to invite one or more other authors to join in creating the dialog; or
combinations thereof.

5. The method of claim 1, wherein the criterion is reaching a solution to provide to the user.

6. The method of claim 1, wherein the criterion is a user stopped answering the next question.

7. The method of claim 1, further including providing a recommendation for the answer based on one or more answers received from one or more friend users of a social networking site associated with the user.

8. The method of claim 1, further including providing a recommendation for the answer based on one or more messages on an instant messaging system.

9. The method of claim 1, further including enabling the user to follow an author of a dialog in the dialog repository.

10. The method of claim 1, further including notifying the user in response to detecting a change in the dialog repository.

11. The method of claim 1, further including:
synchronizing a local dialog repository and utilization data in a local machine with a corresponding data downloaded from a master instance of a dialog manager tool on a remote server;
executing a local instance of the dialog manager tool in the local machine, wherein said steps of receiving an initial answer, selecting, presenting, receiving a next answer, updating, and repeating are performed via the local instance of the dialog manager tool and using the local dialog repository and utilization data on the local machine, wherein the local instance need not be connected to a master instance of the dialog manager tool;
uploading one or more usage statistics generated from said executing the local instance that performs said steps of receiving an initial answer, selecting, presenting, receiving a next answer, updating, and repeating, in response to detecting that the local instance is connected to the master instance in a server; and
synchronizing the local instance of the dialog manager tool and associated local dialog repository with the master instance in the server.

12. A non-transitory computer readable storage medium storing a program of instructions executable by a machine to perform a method of building a runtime dialog, comprising:
receiving an initial answer to an initial question from a user;
creating a state of a conversation thread based on the initial answer;
selecting, automatically by a processor, a next question to ask from a dialog repository based on the updated state of the conversation thread and a question selection policy;
presenting the next question to the user;
receiving a next answer to the next question;
updating the state of the conversation thread based on the next answer;
repeating the selecting, presenting, receiving, and updating until a criterion is satisfied; and
wherein the question selection policy automatically resolves which question to ask next, responsive to finding that multiple questions are eligible to be asked at a point in a dialog, the question selection policy is specified by a dialog author and comprises one or more of a question ordering algorithm and question number algorithm which automatically resolves which question to ask next, a node of the dialog comprising an attached executable computer instruction that invokes a web service,
wherein the state of the conversation thread comprises a pathway through a dialog graph of a dialog knowledge-base, created as a node of the dialog graph becomes activated and represents a live dialog performed with a user, wherein multiple pathways are created representing multiple live dialog threads in a dialog with the user, wherein the question selection policy in resolving which question to ask next from the multiple pathways kept with the user, switches between different question ordering algorithms on the multiple live dialog threads.

13. The computer readable storage medium of claim 12, wherein the question ordering algorithm comprises depth first, breadth wise, usage based weighting, supervised machine learning, or custom scripting, or combinations thereof.

14. The computer readable storage medium of claim 13, further comprising:
authoring a dialog and storing the dialog in the dialog repository, wherein the authoring comprises one or more of:
document-based authoring that extracts one or more nodes and links from an electronic document to create the dialog;
real-time collaborative authoring that allows two or more authors to work on the dialog in the dialog repository in real-time by merging and synchronizing the two or more authors' work;
smart device-based authoring that allows to use a gesture to create a node of the dialog;
topic-based authoring that allows an author to create a topic hierarchy containing multiple topics of a subject matter in a structured format and assign to one or more other authors for creating additional dialogs under the topics; or
crowd-source authoring that allows the author to invite one or more other authors to join in creating the dialog; or
combinations thereof.

15. The computer readable storage medium of claim 12, wherein the question selection policy comprises the question number algorithm.

16. The computer readable storage medium of claim 15, wherein the question number algorithm comprises fixed number, supervised machine learning, or custom scripting, or combinations thereof.

17. The computer readable storage medium of claim 12, wherein the criterion is reaching a solution to provide to the user.

18. The computer readable storage medium of claim 12, further including providing a recommendation for the answer based on one or more answers received from one or more friend users of a social networking site associated with the user.

19. The computer readable storage medium of claim 12, further including providing a recommendation for the answer based on one or more messages on an instant messaging system.

20. The computer readable storage medium of claim 12, further including enabling the user to follow an author of a dialog in the dialog repository.

21. The computer readable storage medium of claim 12, further including notifying the user in response to detecting a change in the dialog repository.

22. The computer readable storage medium of claim 12, further including:
matching the conversation state thread to locate one or more other users who have encountered a same conversation thread;
notifying one or more users with information associated with the same conversation thread;
enabling utilizing of one or more instant messaging systems while performing said steps of receiving an initial answer, selecting, presenting, receiving a next answer, updating, and repeating;
accessing one or more dialog-related discussion forums on a web directly;
sending a notification in response to detecting a change associated with one or more topics and nodes associated with the one or more topics in the dialog repository;
enabling the user to follow one or more other users of a dialog manager tool; or
logging usage associated with said utilizing of one or more instance messaging systems, accessing one or more dialog-related discussion forums, and the user following one or more other users; or
combinations thereof.

23. A system of building a runtime dialog, comprising:
a processor;
a dialog portal operable to execute on the processor and further operable to provide an interface to pose a plurality of questions to a user and receive a corresponding plurality of answers from the user;
a thread maintenance module operable to maintain a conversation state based on the received answers;
a question selection module operable to select a next question to pose based on the conversation state, a question selection policy and a dialog repository; and
wherein the question selection policy automatically resolves which question to ask next, responsive to finding that multiple questions are eligible to be asked at a point in a dialog, the question selection policy is specified by a dialog author and comprises one or more of a question ordering algorithm and question number algorithm which automatically resolves which question to ask next, a node of the dialog comprising an attached executable computer instruction that invokes a web service,
wherein the conversation comprises a pathway through a dialog graph of a dialog knowledgebase, created as a node of the dialog graph becomes activated and represents a live dialog performed with a user, wherein multiple pathways are created representing multiple live dialog threads in a dialog with the user, wherein the question selection module in resolving which question to ask next from the multiple pathways kept with the user, switches between different question ordering algorithms on the multiple live dialog threads.

24. The system of claim 23, wherein the question selection policy specifies the question ordering algorithm comprising depth first, breadth wise, usage based weighting, supervised machine learning, or custom scripting, or combinations thereof.

* * * * *